United States Patent [19]

Rodriguez et al.

[11] Patent Number: 6,144,569
[45] Date of Patent: Nov. 7, 2000

[54] SYSTEM AND METHOD FOR RECOVERING FROM A POWER SUPPLY INTERRUPTION

[75] Inventors: David Rodriguez, Phoenix; Richard S. Griffith, Chandler, both of Ariz.

[73] Assignee: Motorola, Inc., Schaumburg, Ill.

[21] Appl. No.: 09/514,800

[22] Filed: Feb. 29, 2000

[51] Int. Cl.[7] .................................................. H02M 1/00
[52] U.S. Cl. ............................................................. 363/49
[58] Field of Search ............................... 363/49; 307/85, 307/126; 323/901

[56] References Cited

U.S. PATENT DOCUMENTS

| | | | |
|---|---|---|---|
| 4,982,149 | 1/1991 | Shimanuki | 323/274 |
| 5,661,780 | 8/1997 | Mun | 379/61 |
| 5,696,817 | 12/1997 | Yatsu | 379/252 |
| 5,955,843 | 9/1999 | Nuckolls et al. | 315/86 |
| 5,963,015 | 10/1999 | Lee | 320/128 |
| 5,977,659 | 11/1999 | Takehara et al. | 307/85 |
| 6,018,802 | 1/2000 | Abe et al. | 713/300 |

*Primary Examiner*—Adolf Deneke Berhane
*Attorney, Agent, or Firm*—Anthony M. Martinez

[57] ABSTRACT

A power cut detection and recovery system (36) provides for the recovery of an electronic apparatus (20) in response to a momentary interruption in the voltage level of a power supply (46) coupled to that apparatus. The system includes a level detecting circuit (80) coupled to the power supply (46) for monitoring the voltage supplied to the apparatus (20). The system further includes internal reference supply circuits (86) that provide voltage and current references to operate the apparatus (20). A power cut monitor and reference control circuit (84) is coupled to the level detecting circuit (80) and is capable of causing the internal reference supply circuits (86) to remain enabled upon the detection of a momentary cut in the externally supplied power (46). A second level detecting circuit (90), dependent on the internal reference supply circuits (86), and the power cut monitor and reference control circuit (84) are coupled to an under voltage monitor and recovery circuit (88) that can cause the apparatus (20) to restart upon the recovery of the voltage level to a value above a predetermined level. By maintaining the internal reference supply circuits (86) in an enabled state, the apparatus (20) is able to restart in its pre-interruption state if the voltage level remains above a POR level.

19 Claims, 3 Drawing Sheets

SYSTEM AND METHOD FOR RECOVERING FROM A POWER SUPPLY INTERRUPTION

FIELD OF THE INVENTION

This invention relates, in general to a system and method for power failure detection and recovery and, more particularly, to a method and system providing for the recovery of an electronic apparatus such as a cellular telephone in the event of a power supply disconnection.

BACKGROUND OF THE INVENTION

In many types of electronic apparatus a momentary interruption in the power supplied by a power supply, whether battery or other supply, can cause deleterious effects when the power is restored. For example, some electronic apparatus fails to restart properly, or fails to return to the pre-interruption state after the power supply is restored. This is especially true, for example, in an electronic apparatus that includes and requires precise reference supplies, such as reference voltages and reference currents. As a specific example, battery operated portable cellular telephones can experience an interruption in service if the battery power supply is momentarily disconnected from the telephone. A momentary interruption in the power supply can occur, for example, if a cellular phone that is turned on and is in the standby mode is accidentally dropped causing a momentary disconnection of the battery from the telephone. Similarly, a momentary battery disconnect can occur if the cellular telephone is thrust into a pocket, purse, briefcase, belt holder, or the like.

Again, considering a battery powered portable cellular telephone as a specific example, upon disconnection of the battery from the telephone, the voltage level within the cellular telephone drops, with the rate of drop largely dependent upon the capacitive loading and hence the time constant of the internal circuitry. If the power is restored before the internal voltage falls to a value below which the internal references fail to operate, the cellular telephone will return to its operating state without further interruption of service. Similarly, if the battery interruption is terminated after the internal voltages have dropped to a level below the power on reset (POR) level, the internal circuitry will properly reset and the phone operation will restart. If, however, the battery power is restored after the internal voltage falls to a level below the minimum at which functionality of the references is maintained but above the POR level, one of several undesired results may occur. One result may be that the references will turn off causing the telephone to turn off and stay off. Alternatively, the references may become ineffective, causing analog circuitry within the phone to fail to function properly. If that happens, upon power restoration the telephone may be reset in an unknown and nonfunctional state.

Although a number of solutions have been proposed for the problem of temporary interruption of power supply, these solutions have not been deemed acceptable. Some solutions, for example, require additional expensive circuitry or additional components. Further, some solutions cause a noticeable "OFF" state for the apparatus that is unacceptable for customer use.

In view of the foregoing problem, a need exists for a system and a method for handling a momentary interruption in the power supplied to an electronic apparatus such that upon restoration of the power, operation of the apparatus would be restored without noticeable impact upon the user of the apparatus. The system and method should not require additional external components and should not result in a greatly increased current drain.

DETAILED DESCRIPTION OF THE DRAWINGS

Figure 1:
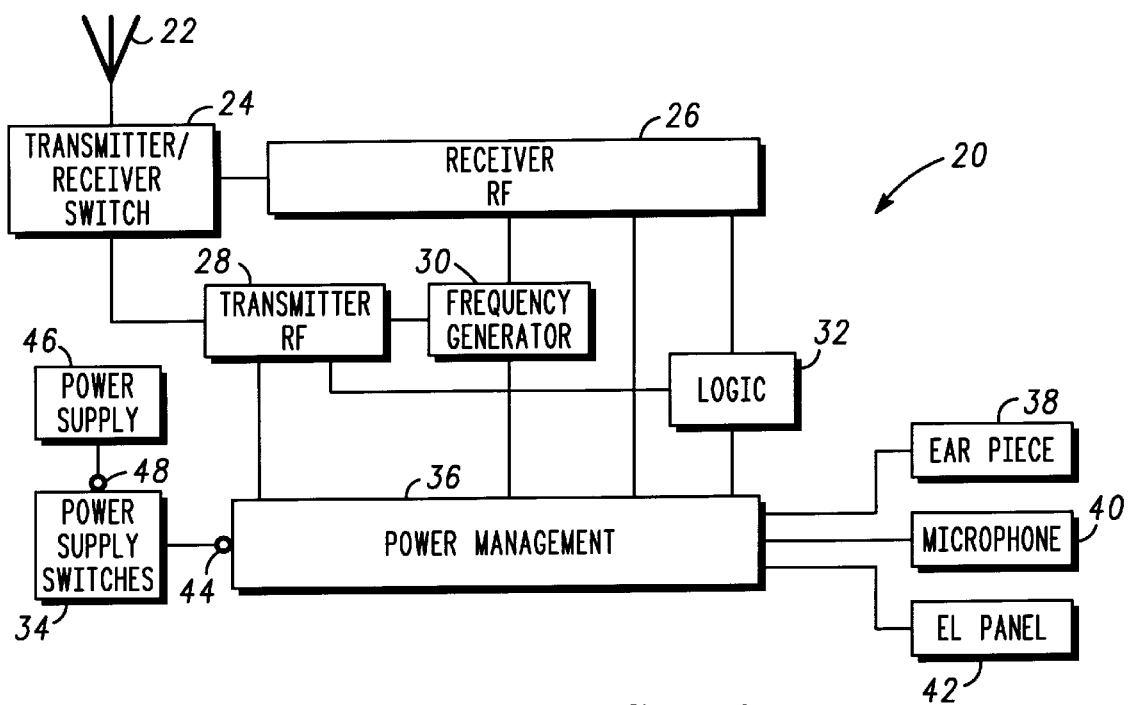
FIG. 1 illustrates schematically, in block diagram form, components of a cellular telephone apparatus.

The invention, in its various embodiments, is applicable to a wide variety of electronic apparatus, but for ease of understanding the invention will be explained and illustrated with reference to its application to a particular type of electronic apparatus, namely a portable cellular telephone. The invention, however, is not limited to this illustrative embodiment and is intended to include all varieties of electronic apparatus as well as the individual components that make up such apparatus, including, for example, the power management integrated circuit to be described below.

Generally, the present invention provides a system providing for restoration of operation of an electronic apparatus following disconnection and reconnection of a power supply coupled to the electronic apparatus, the system comprising: a terminal coupled to the apparatus for receiving a voltage from the power supply; an internal reference supply circuit coupled to the terminal and capable of providing a voltage reference; a first level detecting circuit coupled to the terminal and capable of operating independently of the internal reference supply circuit for monitoring the voltage; a second level detecting circuit coupled to the terminal for monitoring the voltage; a power cut monitor and reference control circuit coupled to receive a first signal from the first level detecting circuit and a second signal from the second level detecting circuit and capable of causing the internal reference supply circuit to remain enabled in response to the first signal and the second signal indicating the voltage is lower than a first predetermined voltage level and greater than a second predetermined voltage level; and an under voltage monitor and recovery circuit coupled to receive a third signal from the second level detecting circuit and capable of causing the electronic apparatus to restart if the voltage monitored by the second level detecting circuit drops below the first predetermined voltage level and thereafter recovers and exceeds a level substantially equal to the first predetermined voltage level.

In addition, the present invention provides a method for recovering from an interruption in voltage level of power supplied to an electronic apparatus that is in a predetermined state and that includes an internal reference supply for powering a recovery system and an external reference supply for powering the apparatus, the method comprising: monitoring the voltage level of power supplied to the electronic apparatus; maintaining the internal reference supply in an enabled state if the voltage level is below a first predetermined voltage level and above a second predetermined voltage level; shutting down the external reference supply when the voltage level is below the first predetermined voltage level and above the second predetermined low voltage level; and returning the electronic apparatus to the predetermined state in response to the voltage level increasing to a level greater than the first predetermined voltage level.

FIG. 1 illustrates schematically the various components of a cellular telephone 20. The cellular telephone includes an antenna 22 for the receipt and transmission of cellular telephone signals. Antenna 22 is coupled to a transmit/receive switch 24 that is operative to transmit or receive telephone signals. Switch 24 is coupled to a receiver radio frequency (RF) component 26 and to a transmitter RF component 28 and serves to selectively couple either the receiver component or transmitter component to antenna 22. RF receiver component 26 may include an RF filter, RF amplifier, RF mixer, analog-to-digital (A/D) converter, baseband circuits, and the like. Similarly, the RF transmitter component 28 may include elements such as a D/A converter, filter, modulator, mixer, power amplifier, and the like. Both receiver component 26 and transmitter component 28 are coupled to a frequency generation component 30. Frequency generation component 30 typically includes a number of phase lock loop (PLL) circuits and voltage controlled oscillators for use by the receiver component and the transmitter component.

Also coupled to RF receiver component 26 and RF transmitter component 28 is a logic component 32 that includes a logic device or decision making device (hereinafter referred to as "decision logic") such as, for example, a microprocessor or microcontroller and may also include a digital signal processor (DSP), memory, and logic circuitry. Component 32 controls the operation of the telephone.

Cellular telephone 20 also includes power supply switches 34 or other mechanism to couple the telephone to an external power supply 46. Power supply 46 may comprise, for example, a portable battery, an automobile battery adapter, or an AC power supply. Power supply 46 is coupled to a terminal 48 of the power supply switches, and through the switches to a power supply input terminal 44 on a power management integrated circuit (IC) 36. Power management IC 36 includes, in addition to other components, internal reference supply circuits that provide the regulated power supplies necessary to operate the power management IC itself. The power management IC also includes external reference supply circuits for external load use such as to power the RF circuitry, baseband circuits, and the like. Power management IC 36 may also be coupled to other components of the cellular telephone such as an earpiece 38, microphone 40 and electroluminescent panel 42.

Figure 2:
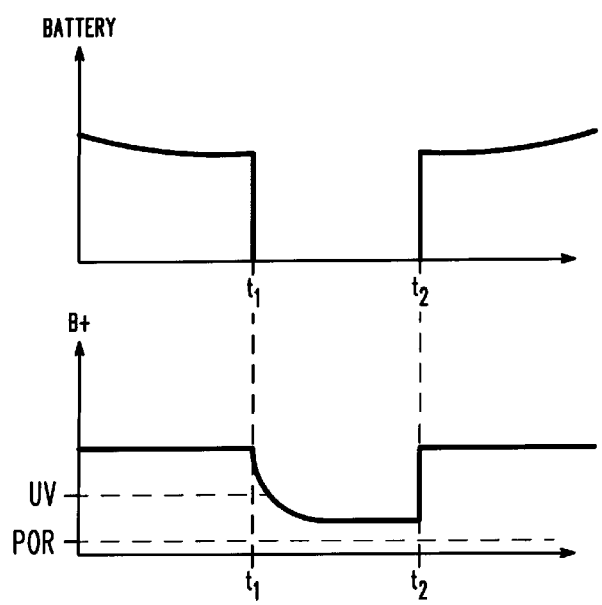
FIG. 2 illustrates, in graphical form, voltage levels encountered during a momentary interruption of supplied power level.

If power supply 46 is disconnected from power supply switches 34, the voltage seen at terminal 44 (hereinafter referred to as the "B+ voltage") will decay. The rate of decay depends on the capacitive loading and leakage current of components coupled to terminal 44 as well as on the state the telephone is in at the time of the disconnection. Initially, the voltage measured at terminal 44 could drop quickly, especially if the telephone was in the "ON" state. At some time, as will be explained more fully below, when the B+ voltage drops below a predetermined level, the external references are turned off and the voltage at terminal 44 thereafter decays slowly. FIG. 2 illustrates the effect of a momentary interruption in the supply of power from power supply 46 to power supply switches 34 and therefore to power management integrated circuit 36. The upper portion of FIG. 2 illustrates the voltage measured at terminal 48, the input to the power supply switches. If power supply 46, such as a portable battery, is temporarily disconnected from terminal 48 at time $t_1$, the voltage measured at that terminal abruptly drops to zero. If the momentary interruption ends at time $t_2$, the voltage applied to terminal 48 returns to its normal value at that time. The lower portion of FIG. 2 illustrates the B+ voltage measured at terminal 44 in response to such a momentary disconnection of power supply 46. As indicated, the B+ voltage begins to decay at time $t_1$ and is restored to its full value at time $t_2$.

Power management integrated circuit 36 can include a power on reset (POR) circuit. The function of the power on reset circuit is to restart the electronic apparatus in a controlled manner after an interruption in power. The power on reset circuit functions, however, only in response to the B+ voltage falling below a prescribed value such as that indicated in FIG. 2. If the B+ voltage falls below the POR level, all circuits are shut down and upon reapplication of the power, the POR circuit restarts each of the individual circuits within the electronic apparatus in an orderly manner. The electronic apparatus thus restarts in a manner similar to the initial turning on of the apparatus. If the B+ voltage does not drop to the POR voltage before the reapplication of power at time $t_2$, the POR circuit is not activated and, in the prior art systems, the telephone may not be restored to its desired state. In those prior art systems, if the B+ voltage falls to a value below an under voltage (UV) value but above the POR voltage, functionality of the telephone cannot be guaranteed upon reapplication of the power supply. The UV value is the minimum value necessary to guarantee that the circuitry in logic component 32, the voltage controlled oscillators in component 30, and the like in other components, maintain proper functional values. Functional restart cannot be guaranteed because the status of the logic circuitry and other components may be indeterminate, in turn, because the voltage supplied to the reference circuits dropped below the minimum value to guarantee functionality, but not below the POR level to invoke a full shut down and restart.

In accordance with the invention, a system and method are provided for the controlled recovery of an electronic apparatus, such as a cellular telephone, following a momentary interruption in the voltage level supplied by an external power supply. The momentary interruption can be caused, for example, by a momentary mechanical disconnect of the battery from the cellular telephone, either intentional or accidental. In the context of this invention, such a momentary interruption of power is referred to as a "power cut." The invention is most easily understood by considering FIG. 3 which illustrates a state diagram in accordance with one embodiment of the invention in conjunction with FIG. 4 that schematically illustrates components of an integrated system in accordance with an embodiment of the invention. The components illustrated in FIG. 4 comprise components in an improved power management integrated circuit 36.

Figure 3:
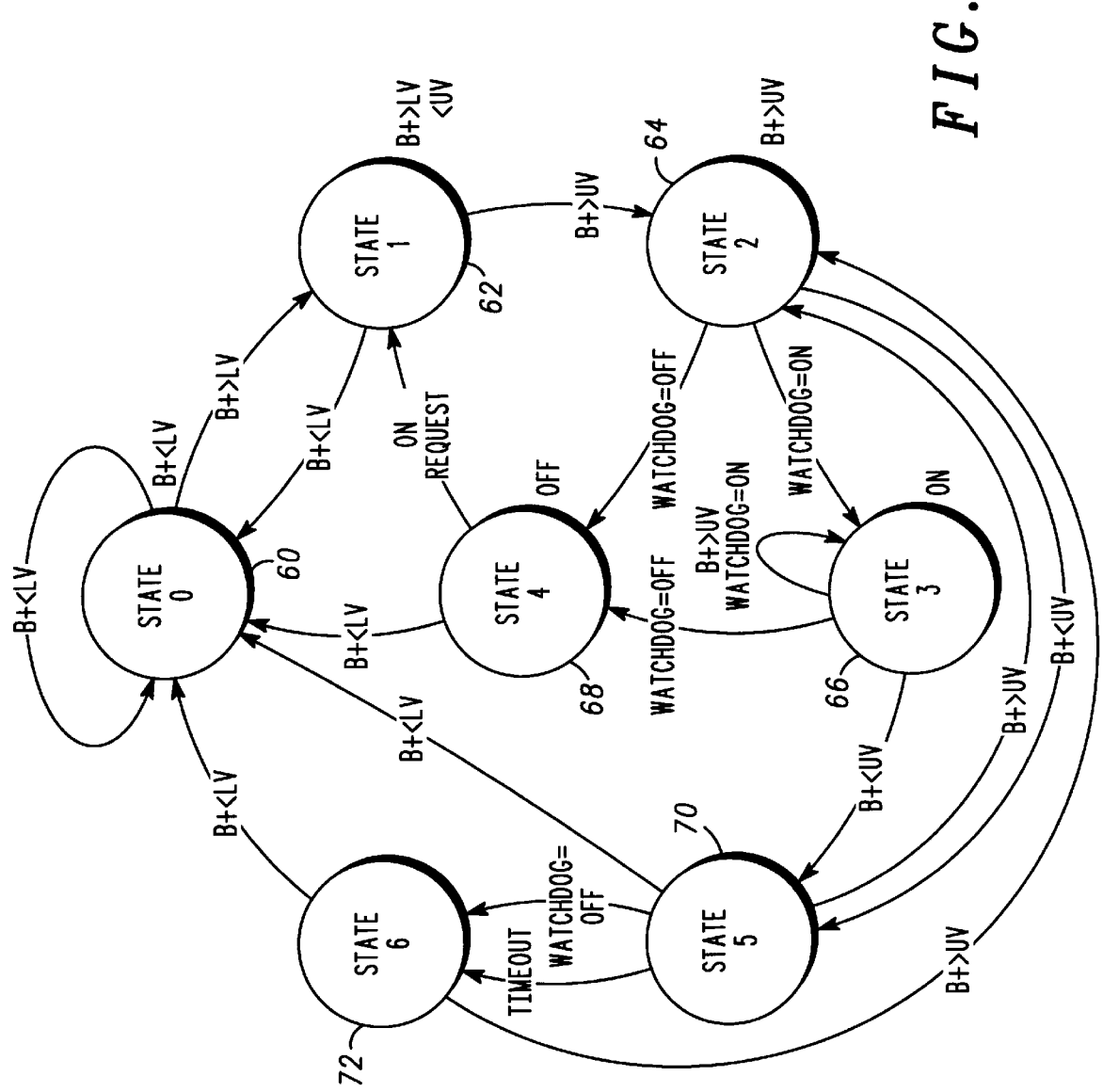
FIG. 3 illustrates a state diagram of an electronic apparatus in accordance with the invention.

FIG. 3 illustrates a state diagram for an electronic apparatus, here a cellular telephone, including both normal modes of operation and power cut modes. The power cut modes, in turn, include controlled recovery from those power cut modes. State 0, indicated by the numeral 60, represents the condition in which the B+ voltage at terminal 44 is below a low voltage (LV) set point. In accordance with one embodiment of the invention, the LV set point is set equal to the POR level, although other voltage levels could be selected. The B+ voltage at terminal 44 can be below the LV set point, for example, if the battery has been drained by extensive use, if the battery is defective, or if the battery has been removed. In state 0 the cellular telephone is non-functional.

In state 1, indicated by the numeral 62, the B+ voltage is above the LV set point, but is below the UV set point value.

Again, the UV set point value is the minimum voltage value necessary to insure that the cellular telephone circuitry maintains functional values. With the B+ voltage above the LV set point value but below the UV set point value, the internal and external reference supply circuits of the power management IC are enabled. Below this voltage value, however, the B+ voltage is-insufficient to generate proper external reference supply voltages to power various loads in the cellular telephone unit so the decision logic in logic component 32 is maintained in a reset state.

If the voltage at terminal 44 exceeds the UV set point value, the telephone circuitry is able to be fully powered and the user can elect to turn on the telephone. This condition is identified as state 2 as indicated by the numeral 64. In state 2, start up continuation or shutdown initiation requests are conveyed to the decision logic of the cellular telephone.

State 3, indicated by the numeral 66, is the "ON" state for the cellular telephone. In state 3 the cellular telephone may be operated in the normal telephone manner. From state 3 the cellular telephone may be turned "OFF" (state 4) or, if the power cut system senses that a power interruption has occurred (i.e., that the B+ voltage is less than the UV set point), the power management integrated circuit 36 is placed in a power cut state (state 5), as discussed below.

State 4, indicated by the numeral 68, is the "OFF" state of the cellular telephone. The power management integrated circuit is maintained in a low power state unless the battery is either removed and B+ voltage drains to a level such that it is less than the level of the LV set point (i.e., state 0), or an "ON" request is received from the user through the decision logic.

In accordance with the present invention, state 5, indicated by the numeral 70, and state 6, indicated by the numeral 72, to be described below, handle a power interruption to the cellular telephone of any duration. As will be explained, this is done without the need for external components or additional significant power consumption and is completely transparent to the user. That is, there are no awkward delays in resumption of cellular telephone operation following the termination of a power supply disruption.

Figure 4:
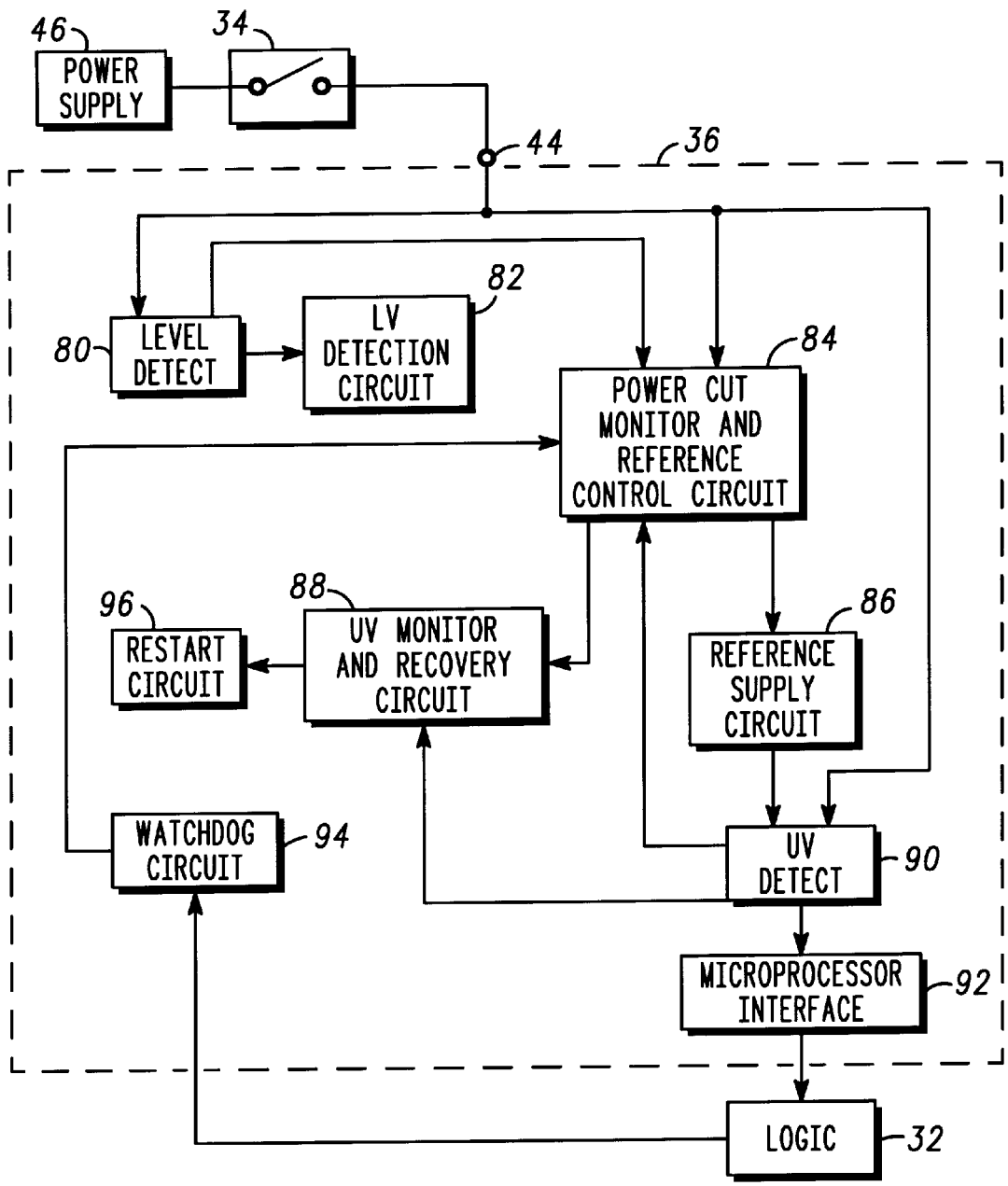
FIG. 4 illustrates, in block diagram form, a power management circuit in accordance with the invention.

To understand the operation of the system, it is instructive to consider the components of the power management integrated circuit, in accordance with one embodiment of the invention, as illustrated in FIG. 4. Like components have been given the same numeral as indicated in FIG. 1. A power supply 46 provides a source of power to terminal 44 of the power management integrated circuit 36 by way of power supply switches 34. An analog level detection circuit 80 detects and monitors the voltage supplied by power supply 46 and operates independently of the state of any of the internal or external references. This operation begins in state 0. The output of level detection circuit 80 is coupled to a LV detection logic circuit 82 and to a power cut monitor and reference control circuit 84. The output of power cut monitor and reference control circuit 84 is coupled to internal reference supply circuit 86 and to a UV monitor and recovery circuit 88. The output of the internal reference supply circuit 86 is coupled to a precision UV detection circuit 90. UV detector 90 is dependent on the internal references and, in accordance with the invention, continues to sense the power supply value in anticipation of any power interruption from power supply 46. Precision UV detection circuit 90 also has an input coupled to terminal 44 and provides accurate voltage sensing of the B+ voltage at terminal 44. The UV detection circuit 90 is thus dependent on the availability of voltage and current references. Preferably UV detection circuit 90, operating from the internal reference supplies, is able to provide a more precise measurement of the applied voltage than is level detection circuit 80. The output of precision UV detection circuit 90 is coupled to a microprocessor interface 92 and to UV monitor and recovery circuit 88. Microprocessor interface 92 is coupled to the decision logic contained in logic circuit 32. In addition to other functions controlled by the decision logic, the decision logic in circuit 32 is also coupled to a watchdog circuit 94. The UV monitor and recovery circuit 88 is coupled to a restart circuit 96.

Consider again the state diagram in FIG. 3. If the cellular telephone is in the "ON" state (i.e., state 3), and a momentary loss of power occurs, the power management integrated circuit enters state 5 when the battery voltage is detected by UV detector 90 to have dropped below the UV set point. All internal and external references are maintained enabled in state 5. Maintenance of the internal and external references is driven by a decision made in the power cut monitor and reference control circuit 84 in recognition that a power cut has occurred as indicated by a signal provided by precision UV detection circuit 90. Upon detection of the UV condition by UV detector 90, a request is sent to the decision logic through microprocessor interface 92 to notify the decision logic 32 that a shut down of external references would be prudent. Unlike the shutdown of a prior art cellular telephone, in accordance with the invention, if the battery voltage detected at terminal 44 thereafter climbs above the UV set point (i.e., the momentary interruption of power has terminated), the power management integrated circuit would move to state 2 and allow the decision logic to place the cellular telephone in the state that existed prior to the power interruption. As those of skill in the art of circuit design will appreciate, some hysteresis is usually built into circuits to avoid potential problems. Thus the threshold for voltage detection necessary to cause the transition to state 2 is usually set at a value substantially equal to the UV level, but slightly higher or lower than the UV level. The threshold can be set, for example at about 50–100 millivolts above or below the UV level. The transition to state 2 is accomplished by a signal provided by UV monitor and recovery circuit 88 to the restart circuit 96. Such a restart is seamless and transparent to the user and corrects for any momentary interruptions such as those caused by repeated mechanical jarring of the cellular telephone and battery. A further drop in battery voltage below the LV set point, in contrast, causes the cellular telephone to transition to state 0.

Thus the cellular telephone enters state 5 from either state 3 or state 2 if the voltage detected at terminal 44 falls below a first predetermined UV level. From state 5 the cellular telephone transitions to state 0 if the voltage falls further to a level less than a second predetermined LV level. In state 0 both the internal and external reference supplies are disabled. If the voltage detected at terminal 44 recovers to a level greater than the first predetermined UV level, the cellular telephone can transition from state 5 to state 2.

The cellular telephone can also transition from state 5 to state 6, indicated by numeral 72, if, while in state 5, either no response is received from the decision logic within a certain predetermined length of time (a "timeout" condition) to indicate that the decision logic understands that a loss of power has occurred or, the decision logic acknowledges the power loss. An acknowledgement by the decision logic would result, for example, in a signal being sent to watchdog circuit 94 ("watchdog=OFF") and a subsequent signal being sent from the watchdog circuit 94 to the power cut monitor and reference control circuit 84. In either case, the external references would be shut down to protect the cellular telephone from any potentially harmful conditions. From state 6 only one of two changes can occur, and these can occur at any time. First, if the battery voltage detected at terminal 44 increases to a level greater than the first predetermined UV level, the cellular telephone returns to state 2 and awaits a command from the decision logic indicating the state in which the cellular telephone should be placed. Second, if the battery voltage detected at terminal 44 continues to decline below the second predetermined LV set point, the system is placed in state 0 and waits reapplication of a functional battery. In this case the voltage supplied by the battery has dropped below the allowed minimum voltage of the entire system and a new start up sequence would be required to restart the cellular telephone and to place all of the circuits in the proper operating condition. Transitioning from state 6 to state 0 in this manner would not necessarily be considered a power cut, but could also be the result of a complete and total depletion of the battery pack or the removal of the battery by a user for replacement, repair or other such normal operation.

Other transitions, in accordance with the invention, are indicated in the state diagram illustrated in FIG. 3. For example, if the cellular telephone is in state 0, the cellular telephone will remain in state 0 if the battery voltage detected at terminal 44 remains less than the predetermined LV level. If the cellular telephone is at state 1, the cellular telephone will return to state 0 if the voltage detected at terminal 44 decreases to a value less than the predetermined LV set point.

If the cellular telephone is in state 2 and the voltage detected at terminal 44 is greater than the first predetermined UV level, the cellular telephone can transition to either state 3 or state 4 depending on the response received from the decision logic in logic circuit 32. The decision logic can send a signal to watchdog circuit 94 indicating that the cellular telephone should turn "ON", state 3 (i.e., watchdog circuit 94 indicates "ON") or that the cellular telephone should turn "OFF" (i.e., watchdog indicates "OFF"). If the watchdog circuit signals "OFF," at least the external references are disabled.

If the cellular telephone is in state 3, the cellular telephone will remain in that state if the voltage detected at terminal 44 remains greater than the predetermined UV set point level and if the watchdog continues to indicate the "ON" state. If the watchdog circuit, instead, indicates the "OFF" state, the cellular telephone will transition from state 3 to state 4.

If the cellular telephone is in state 4, it will remain in state 4 if there is no stimulus requesting the telephone to turn "ON." If there is an "ON" request, such as the user pressing the power key, the cellular telephone will transition from state 4 to state 1.

The present invention has been described in terms of functional block components and various method steps. It should be appreciated that such functional blocks may be realized by any number of hardware components configured to perform the specified functions. For example, LV level detect circuit 80 and precision UV level detect circuit 90 are preferably implemented using conventional analog techniques. Power cut monitor and reference control circuit 84, and UV monitor and recovery circuit 88 are preferably implemented using digital logic gates. Accordingly, illustrative circuit diagrams are not deemed necessary. For a conventional cellular telephone, the power supply usually provides a voltage of about 3.8 volts. The voltage detected at terminal 44, the B+ voltage, is normally about 3.6 volts.

In a preferred embodiment of the invention the predetermined UV level is set to a level of about 2.7 volts and the second predetermined LV level is set to about 2.0 volts, the same as the POR value.

Thus it is apparent that there has been provided, in accordance with the invention, a process and system for handling a momentary interruption in the voltage level of the power supplied to an electronic apparatus that fully meets the needs set forth above. Although the invention has been described and illustrated with reference to specific application to a portable cellular telephone, it is not intended that the invention be so limited. Indeed, the invention can be applied to a variety of other electronic apparatus and it is intended that the invention as set forth in the appended claims be interpreted to encompass all such applications.

What is claimed is:

1. A system providing for restoration of operation of an electronic apparatus following disconnection and reconnection of a power supply coupled to the electronic apparatus, the system comprising:

a terminal coupled to the electronic apparatus for receiving a voltage from the power supply;

an internal reference supply circuit coupled to the terminal and capable of providing a voltage reference;

a first level detecting circuit coupled to the terminal and capable of operating independently of the internal reference supply circuit for monitoring the voltage;

a second level detecting circuit coupled to the terminal for monitoring the voltage;

a power cut monitor and reference control circuit coupled to receive a first signal from the first level detecting circuit and a second signal from the second level detecting circuit and capable of causing the internal reference supply circuit to remain enabled in response to the first signal and the second signal indicating the voltage is lower than a first predetermined voltage level and greater than a second predetermined voltage level; and an under voltage monitor and recovery circuit coupled to receive a third signal from the second level detecting circuit and capable of causing the electronic apparatus to restart if the voltage monitored by the second level detecting circuit drops below the first predetermined voltage level and thereafter recovers and exceeds a level substantially equal to the first predetermined voltage level.

2. The system of claim 1 wherein the second level detecting circuit is-dependent on the internal reference supply circuit.

3. The system of claim 1 further comprising a restart circuit coupled to an output of the under voltage monitor and recovery circuit.

4. The system of claim 1 further comprising an external reference supply circuit for providing a reference supply to a component external to the system.

5. The system of claim 4 further comprising a decision logic circuit coupled for receiving a fourth signal from the second level detecting circuit, the decision logic circuit having the option, in response to the fourth signal indicating that the voltage is lower than the first predetermined voltage level, of either shutting down the external reference supply circuit or waiting for an increase in the voltage.

6. The system of claim 5 further comprising a watchdog circuit coupled to receive a fifth signal from the decision logic circuit and capable of placing the electronic apparatus in either an ON state or an OFF state.

7. The system of claim 6 wherein the watchdog circuit is capable of shutting down the external reference supply circuit in the OFF state.

8. A method for recovering from an interruption in voltage level of power supplied to an electronic apparatus that is in a predetermined state and that includes an internal reference supply for powering a recovery system and an external reference supply for powering the electronic apparatus, the method comprising:

monitoring the voltage level of power supplied to the electronic apparatus;

maintaining the internal reference supply in an enabled state if the voltage level is below a first predetermined voltage level and above a second predetermined voltage level;

shutting down the external reference supply when the voltage level is below the first predetermined voltage level and above the second predetermined voltage level; and returning the electronic apparatus to the predetermined state in response to the voltage level increasing to a level greater than the first predetermined voltage level.

9. The method of claim 8 further comprising shutting down the internal reference supply and the external reference supply in response to the voltage level dropping to a value less than the second predetermined voltage level.

10. The method of claim 9 further comprising restarting the electronic apparatus upon detecting that the voltage level has risen to a level greater than the first predetermined voltage level.

11. The method of claim 10 further comprising returning the electronic apparatus to the predetermined state after restarting the electronic apparatus.

12. The method of claim 8 further comprising shutting down the external reference supply following an elapse of a predetermined amount of time.

13. A method for recovering from a interruption in voltage level of power supplied to an electronic apparatus, wherein the electronic apparatus comprises an internal reference supply and an external reference supply and the electronic apparatus has a number of functional states, the method comprising:

monitoring the voltage level applied to the electronic apparatus;

placing the electronic apparatus in an operational state, wherein the internal and external reference supplies are in an enabled state if the voltage level is greater than a first predetermined voltage level;

transitioning the electronic apparatus to a first power interruption state and maintaining both the internal reference supply and the external reference supply in the enabled state if the voltage level falls below the first predetermined voltage level;

transitioning the electronic apparatus to the operational state from the first power interruption state if the voltage level rises to a level greater than a level substantially equal to the first predetermined voltage level; and transitioning the electronic apparatus to a non operational state from the first power interruption state if the voltage level drops further to a level less than a second predetermined voltage level that is lower than the first predetermined voltage level.

14. The method of claim 13 wherein the electronic apparatus further comprises a decision logic circuit and wherein the method further comprises shutting down the external reference supply and causing the electronic apparatus to enter a second power interruption state if the voltage level has dropped below the first predetermined voltage level.

15. The method of claim 14 further comprising transitioning the electronic apparatus to the operational state from the second power interruption state in response to detecting that the voltage level has increased to a level greater than the first predetermined voltage level.

16. The method of claim 14 further comprising transitioning the electronic apparatus to the non operational state from the second power interruption state in response to detecting that the voltage level has decreased to a level less than the second predetermined voltage level.

17. The method of claim 13 wherein the electronic apparatus further comprises a decision logic circuit and wherein the method further comprises:

apprising the decision logic circuit that the voltage level has dropped below the first predetermined voltage level; and shutting down the external reference supply and causing the electronic apparatus to enter a second power interruption state if no instruction is received from the decision logic circuit within a predetermined amount of time.

18. The method of claim 13 wherein the step of monitoring the voltage level comprises monitoring the voltage level with a level detection circuit operating independently of the internal reference supply.

19. The method of claim 13 wherein the step of monitoring the voltage level comprises monitoring the voltage level with an under voltage level detection circuit operating in response to the internal reference supply.

* * * * *